United States Patent [19]

Gagne

[11] 4,300,778
[45] Nov. 17, 1981

[54] HIGH PRESSURE SHAFT SEAL

[75] Inventor: Roger O. Gagne, Gilford, N.H.

[73] Assignee: International Packings Corporation, Bristol, N.H.

[21] Appl. No.: 119,631

[22] Filed: Feb. 7, 1980

[51] Int. Cl.³ .............................................. F16J 15/32
[52] U.S. Cl. ................................. 277/153; 277/173; 277/188 A; 277/165
[58] Field of Search ............... 277/152, 153, 165, 154, 277/173, 176, 188 R, 188 A

[56] References Cited

U.S. PATENT DOCUMENTS

| 2,998,987 | 9/1961 | Taschenberg et al. | 277/153 X |
| 3,394,939 | 7/1968 | Mastro | 277/188 R X |
| 3,495,843 | 2/1970 | Andersen et al. | 277/153 X |
| 4,039,197 | 8/1977 | Schmidt et al. | 277/188 R X |

FOREIGN PATENT DOCUMENTS

| 972155 | 5/1959 | Fed. Rep. of Germany | 277/152 |
| 2904792 | 8/1979 | Fed. Rep. of Germany | 277/152 |
| 1258972 | 3/1961 | France | 277/152 |

Primary Examiner—Robert S. Ward, Jr.

[57] ABSTRACT

A unitary high pressure shaft seal having an annular floating support element for preventing pressure extrusion of the primary sealing lip by accommodating any relative eccentricity between a moving shaft and a surrounding housing.

7 Claims, 4 Drawing Figures

HIGH PRESSURE SHAFT SEAL

This invention relates to high pressure shaft seals.

High pressure shaft seals frequently include antiextrusion constructions which are intended to prevent extrusion of the primary sealing lip along the shaft when high pressures are present on one side of the seal.

One configuration of such an antiextrusion construction, shown and described in Mastro, U.S. Pat. No. 3,394,939, is deficient in that it completely fails to accommodate the inevitable relative eccentricity between the rotating shaft and the surrounding housing. Although in Andersen et al., U.S. Pat. No. 3,495,843, there is shown and described an antiextrusion construction intended to accommodate the relative eccentricity between the shaft and housing, its arrangement is such that the degree of its accommodation of such relative eccentricity is insufficient in many installations.

In view of the deficiencies of the prior art, as exemplified by the Mastro and Anderson et al. patents, it is a major object of the present invention to provide a novel high pressure seal having an antiextrusion construction which prevents extrusion of the primary sealing lip while accommodating a large amount of relative eccentricity between a moving shaft and its housing.

It is another object of the invention to provide a novel high pressure seal of unitary construction for ease of installation.

It is a further object of the invention to provide a novel high pressure seal having a wiper for preventing contaminants from migrating along the shaft to the antiextrusion element and the primary sealing lip.

Accordingly, the present invention provides a novel high pressure shaft seal for use between a moving shaft and a surrounding stationary housing.

In general, it comprises several components all having their central axes generally coincident with that of the shaft. The components include a rigid case adapted to be fixed relatively to the housing in a position encircling the shaft, a rigid pressure member fitting within the case and cooperating with the case to provide an inwardly open annular groove surrounding the shaft, an elastomeric sealing member mounted within the case, and an annular floating support element mounted within the groove for free radial movement therein to accommodate any relative eccentricity between the shaft and housing and so prevent pressure extrusion of the elastomeric sealing element along the shaft.

More specifically, the rigid case is preferably of metal and has an outer annular wall portion fitting within the housing and a front wall portion extending radially inwardly perpendicular to the central axis toward the shaft on the lower pressure side of the seal. The rigid pressure member is also preferably of metal and has an outer annular wall portion fitting within the case with its front end abutting the front wall portion of the case and a rear wall portion extending radially inwardly perpendicular to the central axis toward the shaft and spaced from the front wall portion of the case. The annular groove, with its bottom spaced radially outwardly from the shaft, is provided between the front wall portion of the case and the rear wall portion of the pressure member.

The annular floating support element is mounted within the groove with its outer surface spaced radially inwardly from the bottom of the groove for free radial movement therein with its inner surface engaging the shaft.

The elastomeric primary sealing member has its outer annular wall portion fitting within the outer annular wall portion of the rigid case with its front side abutting the rear wall portion of the pressure member and with its radially inwardly directed sealing lip engaging the shaft. It preferably has an annular spring retaining groove located radially outwardly of its sealing lip with a continuous coil spring mounted therein, providing an inwardly directed force biasing the sealing lip into contact with the shaft.

In preferred embodiments, the rear side of the sealing member may be frusto-conical, flaring toward the high pressure side of the sealing member; and the floating support element may also have a generally frusto-conical outer surface cooperating with the like surface on the sealing member.

In further preferred embodiments, the rigid case may have an elastomeric material molded onto its outer annular wall portion to facilitate its fit and retention within the surrounding stationary housing, as well as to provide a seal within the stationary housing, and its front wall portion may be provided with a wiper lip engaging the shaft on the lower pressure side of the seal to prevent contaminants from migrating along the shaft to the floating support element and the sealing member.

Other objects, features, and advantages of the present invention will appear from the following detailed description of a preferred embodiment thereof, taken together with the accompanying drawings, wherein.

Figure 1:
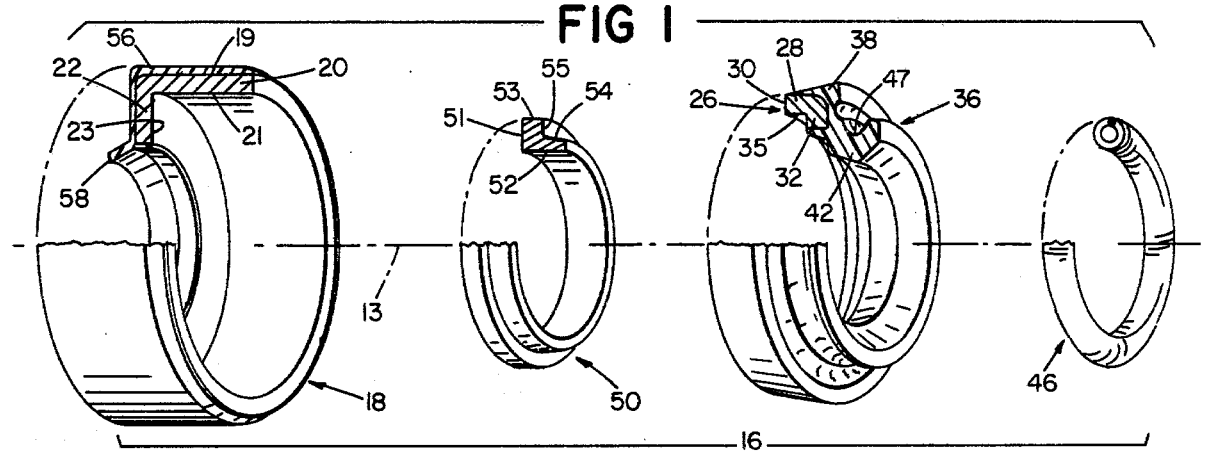
FIG. 1 is an exploded view of the components of the high pressure shaft seal according to the present invention.

Referring to the drawings, the present invention provides a novel unitary high pressure shaft seal, generally designated 16, for use between a rotating or reciprocating shaft 12 and a surrounding stationary housing 14, both having a common central axis 13.

Figure 3:
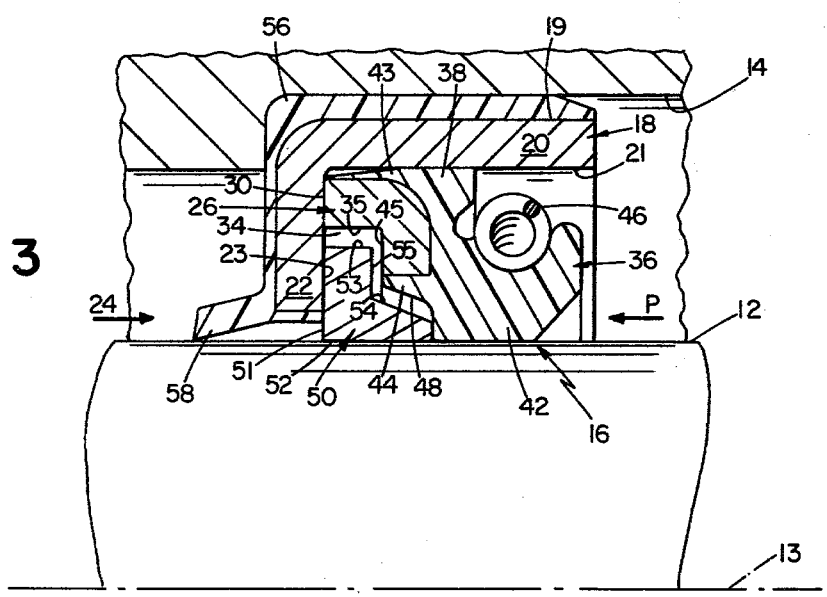
FIG. 3 is a fragmentary radial sectional view of the shaft seal shown in FIGS. 1 and 2 in its operating condition.

In general, it comprises a rigid case, generally designated 18, adapted to be fixed relatively to housing 14 in a position encircling shaft 12; a rigid pressure member, generally designated 26, fitting within case 18 and cooperating with it to provide an inwardly open annular groove 34 surrounding shaft 12; an elastomeric sealing member, generally designated 36, also mounted within case 18; and an annular floating support element, generally designated 50, mounted within groove 34 for free radial movement therein to accommodate any relative eccentricity between shaft 12 and housing 14 and so prevent extrusion of elastomeric sealing member 36 along shaft 12 in the direction shown by the arrow P in FIG. 3.

More specifically, rigid case 18 is preferably of metal and has its central axis 13 coincident with that of shaft 12. It has an outer annular wall portion 20 having an outer cylindrical surface 19 adapted to fit within housing 14 and an inner cylindrical surface 21. It also has a front wall portion 22, having an inner wall surface 23, extending radially inwardly perpendicular to central axis 13 toward shaft 12 on the lower pressure side 24 of seal 16.

Pressure member 26 is also preferably of metal and has its central axis 13 generally coincident with that of shaft 12. It has an outer annular wall portion 28 having an inner cylindrical surface 35 and an outer cylindrical surface 27 spaced radially inwardly of inner surface 21 of case 18 with its front end surface 30 abutting the front wall surface 23 of case 18 and a rear wall portion 32 extending radially inwardly perpendicular to central axis 13 toward shaft 12 and spaced from the front wall portion 22 of case 18 to form therebetween an inwardly open annular groove 34 surrounding shaft 12. Rear wall portion 32 has its annular inner surface 33 spaced radially outwardly from shaft 12.

Elastomeric primary sealing member 36 also has its central axis 13 coincident with that of shaft 12. It has an outer annular wall portion 38 fitting within outer annular wall portion 20 of rigid case 18 and a radially inwardly directed sealing lip 42 for engaging shaft 12. Preferably, sealing member 36 is adhesively attached to pressure member 26 to form a unit therewith for ease of assembly with the outer front portion 43 of outer wall portion 38 surrounding the outer annular wall portion 28 of pressure member 26; with the front side 40 abutting the rear wall portion 32 of pressure member 26; and with the inner front portion 44 attached to the annular inner surface 33 of pressure member 26.

Figure 4:
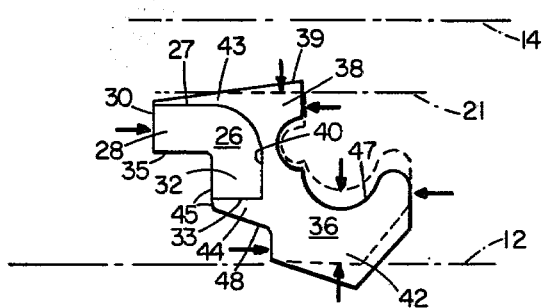
FIG. 4 is an explanatory view of the elastomeric primary sealing member in both non-operating and operating conditions.

The outer wall portion 38 of sealing member 36 is generally frusto-conical, flaring outwardly toward the high pressure side of seal 16, as indicated by the arrow P in FIG. 3. It has an outer surface 39 that is spaced inwardly from the inner surface 21 of case 18 at the outer front portion 43 but abuts inner surface 21 with an interference fit adjacent the high pressure side P. Because of such frusto-conical shape, whereby the diameter of the outer wall portion 38 of sealing member 36 is smaller toward the lower pressure side 24 than toward the high pressure side P, illustrated in its non-assembled position in FIG. 4, sealing member 36 fits easily into rigid case 18 during assembly of shaft seal 16.

Primary sealing member 36 also has an annular spring retaining groove 47 located radially outwardly of its sealing lip 42 with a continuous coil spring 46 mounted therein, providing an inwardly directed force biasing sealing lip 42 into contact with shaft 12.

Annular groove 34 has a lower pressure side axial surface 23 on the front wall portion 22 of case 18; a cylindrical inner surface 35 on the outer annular wall portion 28 of pressure member 26 and spaced radially outwardly from shaft 12; a high pressure side axial surface 45 on both the rear wall portion 32 of pressure member 26 and the inner front portion 44 of sealing member 36; and a frusto-conical inner side surface 48 on the inner front portion 44 of sealing member 36.

Particularly in accordance with the present invention, a novel annular floating support element 50, of rigid metal or plastic material, is mounted within groove 34 for free radial movement therein. Support element 50 has an inner surface 52 for engaging shaft 12; a lower pressure side axial surface 51 spaced axially from the lower pressure side axial surface 23 of annular groove 34; a cylindrical outer surface 53 of smaller diameter than that of the cylindrical inner surface of annular groove 34 so that it is spaced radially inwardly therefrom; a high pressure side axial surface 55 spaced axially from the high pressure side axial surface 45 of annular groove 34; and a generally frusto-conical outer side surface 54 spaced radially inwardly from the frusto-conical inner side surface 48 of annular groove 34. Cylindrical inner surface 35 is radially spaced from its counterpart cylindrical outer surface 53, when assembled, as are axial surfaces 23, 51, 45, 55 and also frusto-conical surfaces 48 and 54, thus allowing radial movement of support element 50 in order to accommodate any relative eccentricity between shaft 12 and housing 14, in order to prevent extrusion of the elastomeric sealing member 36 along shaft 12.

Rigid case 18 also has an elastomeric material 56 molded onto its outer annular wall portion surface 19 adapted to be received within surrounding stationary housing 14. The elastomeric material 56 compensates for imperfect dimensions, such as shaft seal 16 having an outer diameter smaller than manufacturing specifications or housing 14 having an inner diameter greater than specifications, by providing a unitary shaft seal 16 having an outer diameter which is always greater than the inner diameter of housing 14. Consequently, shaft seal 16 will fit properly with an interference fit within housing 14 so that it will be retained thereby, regardless of imperfect dimensions.

Elastomeric material 56 also includes a wiper lip 58 that engages shaft 12 on the lower pressure side 24 of seal 16 for preventing contaminants from migrating along shaft 12 to sealing member 36 and floating support element 50.

During assembly of shaft seal 16 into a unit, as best shown in FIG. 1, annular floating support element 50 is placed in rigid case 18 with its side surface 51 adjacent surface 23 of case 18. The unitary elastomeric primary sealing member 36 and rigid pressure member 26 are fitted next into rigid case 18. The front end surface 30 of pressure member 26 abuts the front wall portion 22 of rigid case 18, and the outer annular wall portion 38 of sealing member 36 abuts the outer annular wall portion 20 of rigid case 18 with an interference fit. The frusto-conical shape of this unitary body makes it easier to fit it into rigid case 18. The continuous coil spring 46 is mounted last into the annular spring retaining groove 47 of sealing member 36.

During installation of unitary shaft seal 16 within housing 14, rigid case 18 is oriented with wiper lip 58 toward the direction that will be the lower pressure side 24 when shaft seal 16 is mounted on shaft 12.

Figure 2:
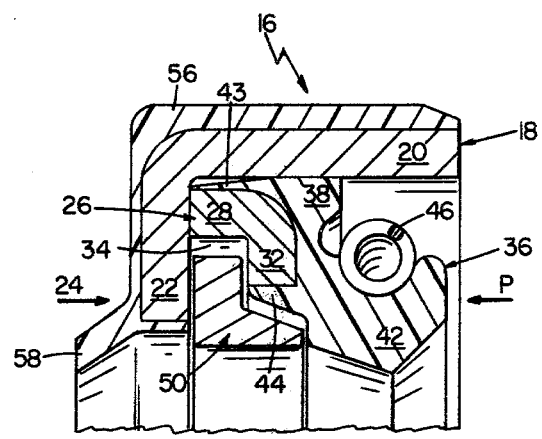
FIG. 2 is a fragmentary radial sectional view of the shaft seal shown in FIG. 1.

In operation, elastomeric sealing lip 42 and wiper lip 54 move radially outwardly with respect to their central axes 13, from their non-operative condition, as shown in FIG. 2, to an operative condition as shaft seal 16 is mounted on shaft 12, as shown in FIG. 3. The radially outward movement of sealing lip 42 is diagramatically shown in FIG. 4, in which the solid line represents sealing lip 42 in its non-operative condition and the dotted lines represent it in its operative condition.

The continuous coil spring 46 provides a radially inwardly directed force that biases sealing lip 42 into contact with shaft 12 and thereby prevents the escape of the liquid from the high pressure side P along shaft 12. When shaft 12 is rotating or reciprocating, annular floating support element 50 prevents the pressure extrusion of the elastomeric sealing member 36 toward the lower pressure side 24 by pressure P. In addition, support element 50 moves radially within annular groove 34 to accommodate any relative eccentricity between rotating shaft 12 and housing 14 while preventing pressure extrusion of sealing member 36 along shaft 12.

Wiper lip 58, which engages shaft 12 at the lower pressure side 24 of seal 16, prevents contaminants from migrating into support element 50 and sealing member 36.

What is claimed is:

1. A high pressure shaft seal for use between a moving shaft and a surrounding stationary housing, said housing having an opening extending therethrough and receiving said shaft therein, comprising:

a rigid case adapted to be fixed relatively to said housing in a position encircling said shaft, said rigid case having a central axis generally coincident with that of said shaft and comprising an outer annular wall portion fitting within said housing and a front wall portion extending radially inwardly perpendicular to said central axis toward said shaft on the lower pressure side of said seal, a rigid pressure member having a central axis generally coincident with that of said shaft and comprising an outer annular wall portion fitting within said housing with its front end abutting said front wall portion of said case and a rear wall portion extending radially inwardly perpendicular to said central axis toward said shaft and spaced from said front wall portion of said case to form therebetween an inwardly open annular groove having its bottom spaced radially outwardly from said shaft, an elastomeric primary sealing member having a central axis generally coincident with that of said shaft and comprising an outer annular wall portion fitting within said outer annular wall portion of said rigid case with its front side abutting said rear wall portion of said pressure member and a radially inwardly directed sealing lip for engaging said shaft, and an annular floating support element mounted within said groove for free radial movement therein, said support element having an inner surface for engaging said shaft and an outer surface spaced radially inwardly from the bottom of said annular groove, whereby said floating support element is free to move radially within said groove with said shaft to accommodate any relative eccentricity between said shaft and said housing and so prevent extrusion of said primary sealing lip between said shaft and said support element.

2. A high pressure shaft seal for use between a moving shaft and a surrounding stationary housing, said housing having an opening extending therethrough and receiving said shaft therein, comprising:

a rigid case adapted to be fixed relatively to said housing in a position encircling said shaft, said rigid case having a central axis generally coincident with that of said shaft and comprising an outer annular wall portion fitting within said housing and a front wall portion extending radially inwardly perpendicular to said central axis toward said shaft on the lower pressure side of said seal, a rigid pressure member having a central axis generally coincident with that of said shaft and comprising an outer annular wall portion fitting within said housing with its front end abutting said front wall portion of said case and a rear wall portion extending radially inwardly perpendicular to said central axis toward said shaft and spaced from said front wall portion of said case to form therebetween an inwardly open annular groove having its bottom spaced radially outwardly from said shaft, an elastomeric primary sealing member having a central axis generally coincident with that of said shaft and comprising an outer annular wall portion fitting within said outer annular wall portion of said rigid case with its front side abutting said rear wall portion of said pressure member and a radially inwardly directed sealing lip for engaging said shaft, said bottom of said annular groove being a generally frusto-conical inner surface formed from said rear wall portion of said pressure member and said front side of said sealing member, and an annular floating support element mounted within said groove for free radial movement therein, said support element having an inner surface for engaging said shaft and a generally frusto-conical outer surface spaced radially inwardly from said frusto-conical inner surface of said annular groove, whereby said floating support element is free to move radially within said groove with said shaft to accommodate any relative eccentricity between said shaft and said housing and so prevent extrusion of said primary sealing lip between said shaft and said support element.

3. A high pressure shaft seal for use between a moving shaft and a surrounding stationary housing, said housing having an opening extending therethrough and receiving said shaft therein, comprising:

a rigid case adapted to be fixed relatively to said housing in a position encircling said shaft, said rigid case having a central axis generally coincident with that of said shaft and comprising an outer annular wall portion fitting within said housing and a front wall portion extending radially inwardly perpendicular to said central axis toward said shaft on the lower pressure side of said seal, a rigid pressure member having a central axis generally coincident with that of said shaft and comprising an outer annular wall portion fitting within said housing with its front end abutting said front wall portion of said case and a rear wall portion extending radially inwardly perpendicular to said central axis toward said shaft and spaced from said front wall portion of said case to form therebetween an inwardly open annular groove having its bottom spaced radially outwardly from said shaft, an elastomeric primary sealing member having a central axis generally coincident with that of said shaft and comprising an outer annular wall portion fitting within said outer annular wall portion of said rigid case with its front side abutting said rear wall portion of said pressure member and a radially inwardly directed sealing lip for engaging said shaft, said sealing member being generally frusto-conical with its said front side being of smaller diameter and flaring toward the back side of said sealing member, and an annular floating support element mounted within said groove for free radial movement therein, said support element having an inner surface for engaging said shaft and an outer surface spaced radially inwardly from the bottom of said annular groove, whereby said floating support element is free to move radially within said groove with said shaft to accommodate any relative eccentricity between said shaft and said housing and so prevent extrusion of said primary sealing lip between said shaft and said support element.

4. The high pressure shaft seal of claim 1, 2 or 3 wherein
said rigid case and said rigid pressure member are of metallic material.

5. The high pressure shaft seal of claim 1, 2 or 3 wherein
said rigid case has an elastomeric material molded onto said outer annular wall portion and said front wall portion with a wiper lip engaging said shaft on said lower pressure side of said seal to prevent contaminants from migrating into said sealing member and said floating support element.

6. The high pressure shaft seal of claim 1, 2 or 3 wherein
said primary sealing member has an annular spring retaining groove located radially outwardly of said sealing lip, and
a continuous coil spring is mounted in said annular spring retaining groove providing a radially inwardly directed force biasing said sealing lip into radially inward contact with said shaft.

7. A high pressure shaft seal for use between a moving shaft and a surrounding stationary housing, said housing having an opening extending therethrough and receiving said shaft therein, comprising:
a rigid metallic case adapted to be fixed relatively to said housing in a position encircling said shaft, said rigid case having a central axis generally coincident with that of said shaft and comprising an outer annular wall portion fitting within said housing and a front wall portion extending radially inwardly perpendicular to said central axis toward said shaft on the lower pressure side of said seal, said rigid case having an elastomeric material molded onto said outer annular wall portion and said front wall portion with a wiper lip engaging said shaft on said lower pressure side of said seal,
a rigid metallic pressure member having a central axis generally coincident with that of said shaft and comprising an outer annular wall portion fitting within said housing with its front end abutting said front wall portion of said case and a rear wall portion extending radially inwardly perpendicular to said central axis toward said shaft and spaced from said front wall portion of said case to form therebetween an inwardly open annular groove having its bottom spaced radially outwardly from said shaft,
an elastomeric primary sealing member having a central axis generally coincident with that of said shaft and comprising an outer annular wall portion fitting within said outer annular wall portion of said rigid case with its front side abutting said rear wall portion of said pressure member and a radially inwardly directed sealing lip for engaging said shaft, said sealing member being generally frusto-conical with its said front side being of smaller diameter and flaring toward the back side of said sealing member, said primary sealing member having an annular spring retaining groove located radially outwardly of said sealing lip, and a continuous coil spring mounted in said annular spring retaining groove providing a radially inwardly directed force biasing said sealing lip into radially inward contact with said shaft,
a portion of said bottom of said annular groove being a generally frusto-conical inner surface formed from said rear wall portion of said pressure member and said front side of said sealing member,
an annular floating support element mounted within said groove for free radial movement therein, said support element having an inner surface for engaging said shaft and including a generally frusto-conical outer surface spaced radially inwardly from said frusto-conical inner surface of said annular groove,
whereby said floating support element is free to move radially within said groove with said shaft to accommodate any relative eccentricity between said shaft and said housing and so prevent extrusion of said primary sealing lip between said shaft and said support element,
said elastomeric material molded onto said outer annular wall portion of said rigid case being adapted to be received within said surrounding stationary housing, and
said front wall portion wiper lip engaging said shaft on said lower pressure side of said seal to prevent contaminants from migrating into said sealing member and said floating support element.

* * * * *